(12) United States Patent
Belloni et al.

(10) Patent No.: US 9,258,794 B2
(45) Date of Patent: Feb. 9, 2016

(54) METHOD, AND APPARATUS FOR DETERMINING THE POSITION USING RADIO SIGNALS

(75) Inventors: Fabio Belloni, Espoo (FI); Ilari Aleksi Teikari, Helsinki (FI); Ville Ranki, Espoo (FI); Antti Kainulainen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 404 days.

(21) Appl. No.: 13/581,860

(22) PCT Filed: Mar. 1, 2010

(86) PCT No.: PCT/IB2010/050861
§ 371 (c)(1),
(2), (4) Date: Aug. 30, 2012

(87) PCT Pub. No.: WO2011/107825
PCT Pub. Date: Sep. 9, 2011

(65) Prior Publication Data
US 2012/0326929 A1   Dec. 27, 2012

(51) Int. Cl.
*G01S 1/12* (2006.01)
*H04W 64/00* (2009.01)
*G01S 1/24* (2006.01)

(52) U.S. Cl.
CPC . *H04W 64/00* (2013.01); *G01S 1/24* (2013.01)

(58) Field of Classification Search
CPC .............. G01S 1/12; G01S 1/08; G01S 1/24; H01Q 21/06; H01Q 21/24; H04W 64/00
USPC ......................................... 342/417, 362, 386
See application file for complete search history.

(56) References Cited

U.S. PATENT DOCUMENTS

| | | | | |
|---|---|---|---|---|
| 5,526,001 A * | 6/1996 | Rose et al. | | 342/442 |
| 8,203,485 B2 * | 6/2012 | Shirakawa | | 342/417 |
| 8,760,347 B1 * | 6/2014 | Lu | | 342/465 |
| 2002/0122003 A1 | 9/2002 | Patwari et al. | | |
| 2008/0068265 A1 * | 3/2008 | Kalliola et al. | | 342/418 |
| 2008/0232281 A1 | 9/2008 | Pahlavan et al. | | |
| 2009/0243933 A1 * | 10/2009 | Shirakawa | | 342/417 |
| 2010/0265799 A1 * | 10/2010 | Cevher et al. | | 367/121 |

(Continued)

FOREIGN PATENT DOCUMENTS

| | | |
|---|---|---|
| CN | 1488076 A | 4/2004 |
| KR | 10-0769115 B1 | 10/2007 |
| WO | 02/054100 A2 | 7/2002 |

(Continued)

OTHER PUBLICATIONS

International Search Report and Written Opinion received for corresponding International Patent Application No. PCT/IB2010/050861, dated Nov. 11, 2010, 12 pages.

Office action received for corresponding Chinese Patent Application No. 201080066547.1, dated Sep. 11, 2013, 8 pages of Office Action, No English Language Translation available.

(Continued)

*Primary Examiner* — Harry Liu
(74) *Attorney, Agent, or Firm* — Locke Lord LLP (57) ABSTRACT

A method, comprising: detecting, at an apparatus, one or more radio signals from a first location; using the one or more detected radio signals to estimate a bearing from the first location; and using the bearing estimate to determine whether further detection of one or more radio signals is required before positioning the apparatus; and positioning of the apparatus using a bearing and constraint information.

18 Claims, 9 Drawing Sheets

(56) References Cited

U.S. PATENT DOCUMENTS

2010/0311456 A1* 12/2010 Inoue et al. .................. 455/513
2012/0232838 A1* 9/2012 Kemppi et al. ............... 702/150

FOREIGN PATENT DOCUMENTS

| WO | 2009/022192 A1 | 2/2009 |
| WO | 2009/056150 A1 | 5/2009 |

OTHER PUBLICATIONS

Office Action received for corresponding Chinese Application No. 201080066547.1, dated May 15, 2014, 7 pages.

Final office action received for corresponding Chinese Patent Application No. 201080066547.1, dated Aug. 28, 2014, 5 pages of Office Action, No English Language Translation available.

* cited by examiner

METHOD, AND APPARATUS FOR DETERMINING THE POSITION USING RADIO SIGNALS

RELATED APPLICATION

This application was originally filed as PCT Application No. PCT/IB2010/050861 filed Mar. 1, 2010.

FIELD OF THE INVENTION

Embodiments of the present invention relate to positioning. In particular, they relate to a method, an apparatus, a module, a chipset or a computer program for positioning using radio signals.

BACKGROUND TO THE INVENTION

There are a number of known techniques for determining the position of an apparatus using radio frequency signals. Some popular techniques relate to use of the Global Positioning System (GPS), in which multiple satellites orbiting Earth transmit radio frequency signals that enable a GPS receiver to determine its position. However, GPS is often not very effective in determining an accurate position indoors.

Some non-GPS positioning techniques enable an apparatus to determine its position indoors. However, some of these techniques do not result in an accurate position being determined, and others are too complex for use simply in a portable apparatus. For example, the amount of processing power required to perform the technique may be impractical to provide in a portable apparatus, which may need to perform concurrent functions.

BRIEF DESCRIPTION OF VARIOUS EMBODIMENTS OF THE INVENTION

According to various embodiments of the invention there is provided a method, comprising: detecting, at an apparatus, one or more radio signals from a first location; using the one or more detected radio signals to estimate a bearing from the first location; and using the bearing estimate to determine whether further detection of one or more radio signals is required before positioning the apparatus; and positioning of the apparatus using a bearing and constraint information.

According to various embodiments of the invention there is provided an apparatus, comprising: a receiver configured to detect one or more radio signals from a first location; processing circuitry configured to use the one or more detected radio signals to estimate a bearing of the apparatus from the first location; and configured to use the bearing estimate to determine whether further detection of one or more radio signals is required before positioning the apparatus; and configured to position the apparatus using a bearing and constraint information.

According to various embodiments of the invention there is provided an apparatus, comprising: means for detecting, at an apparatus, one or more radio signals from a first location; means for using the one or more detected radio signals to estimate a bearing from the first location; and means for using the bearing estimate to determine whether further detection of one or more radio signals is required before positioning the apparatus; and means for positioning of the apparatus using a bearing and constraint information.

According to various embodiments of the invention there is provided a module, comprising: processing circuitry configured to use one or more detected radio signals to estimate a bearing; and configured to use the bearing estimate to determine whether further detection of one or more radio signals is required before determining a position; and configured to determine a position using a bearing and constraint information.

According to various embodiments of the invention there is provided a computer program, comprising computer readable instructions which when loaded into a processor enable: use of one or more detected radio signals to estimate a bearing; use of the bearing estimate to determine whether further detection of one or more radio signals is required before determining a position; and using a bearing and constraint information to determine a position.

Some embodiments of the invention adaptively use different positioning strategies.

In some embodiments, two-way communications such as a ranging measurement is only used when required. This reduces power consumption and more efficiently shares the radio spectrum for communication while still providing for accurate positioning.

In some embodiments, the positioning method is dynamically adaptive and acquires new constraint information when required but only when required for accurate positioning.

In some embodiments, the positioning method is dynamically adaptive and acquires new constraint information by ranging only when it is likely to improve the accuracy of positioning.

BRIEF DESCRIPTION OF THE DRAWINGS

For a better understanding of various embodiments of the present invention reference will now be made by way of example only to the accompanying drawings in which.

DETAILED DESCRIPTION OF VARIOUS EMBODIMENTS OF THE INVENTION

The Figures illustrate detecting, at an apparatus 10, radio signals 50 from a first location 80; using the one or more detected radio signals to estimate a bearing 82 from the first location 80; and using the bearing estimate 82 to determine whether further detection of one or more radio signals is required before positioning the apparatus 10; and positioning of the apparatus 10 using a bearing and constraint information.

Figure 1:
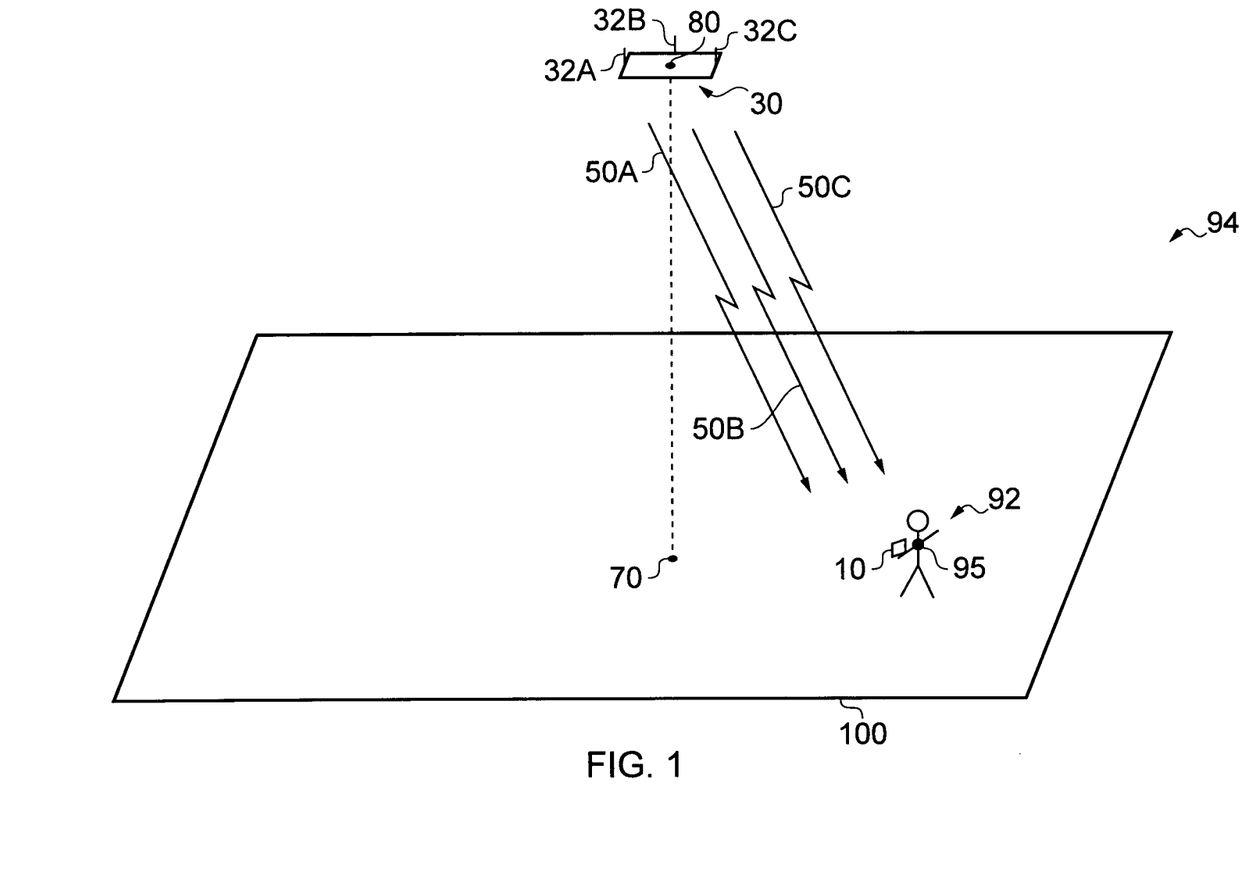
FIG. 1 illustrates an apparatus receiving radio signals from a transmitter.

FIG. 1 illustrates a person 92 (carrying a receiver apparatus 10) at a position 95 on a floor 100 of a building 94. The building 94 could be, for example, a shopping center or a conference center.

A base station transmitter 30 is positioned at a location 80 of the building 94. In the illustrated example, the location 80 is on the ceiling of the building 94 (i.e. the overhead interior surface) but in other implementations the transmitter may be placed elsewhere such as on a wall.

The location 80 is directly above the point denoted with the reference numeral 70 on the floor 100 of the building. The transmitter 30 is for enabling a user of an apparatus 10, such as the person 92, to determine his position 95, although that is not necessarily the only function provided by the transmitter 30. For example, the transmitter 30 may be part of a transceiver for providing wireless internet access to users of apparatuses 10, for example, via wireless local area network (WLAN) radio signals.

The position 95 of the person 92 is defined by specifying a position along a bearing 82 (illustrated in FIG. 4) which runs from the location 80 of the transmitter 30 through the location 95 of the apparatus 10, The bearing 82 is defined by an elevation angle θ and an azimuth angle φ.

Figure 2A:
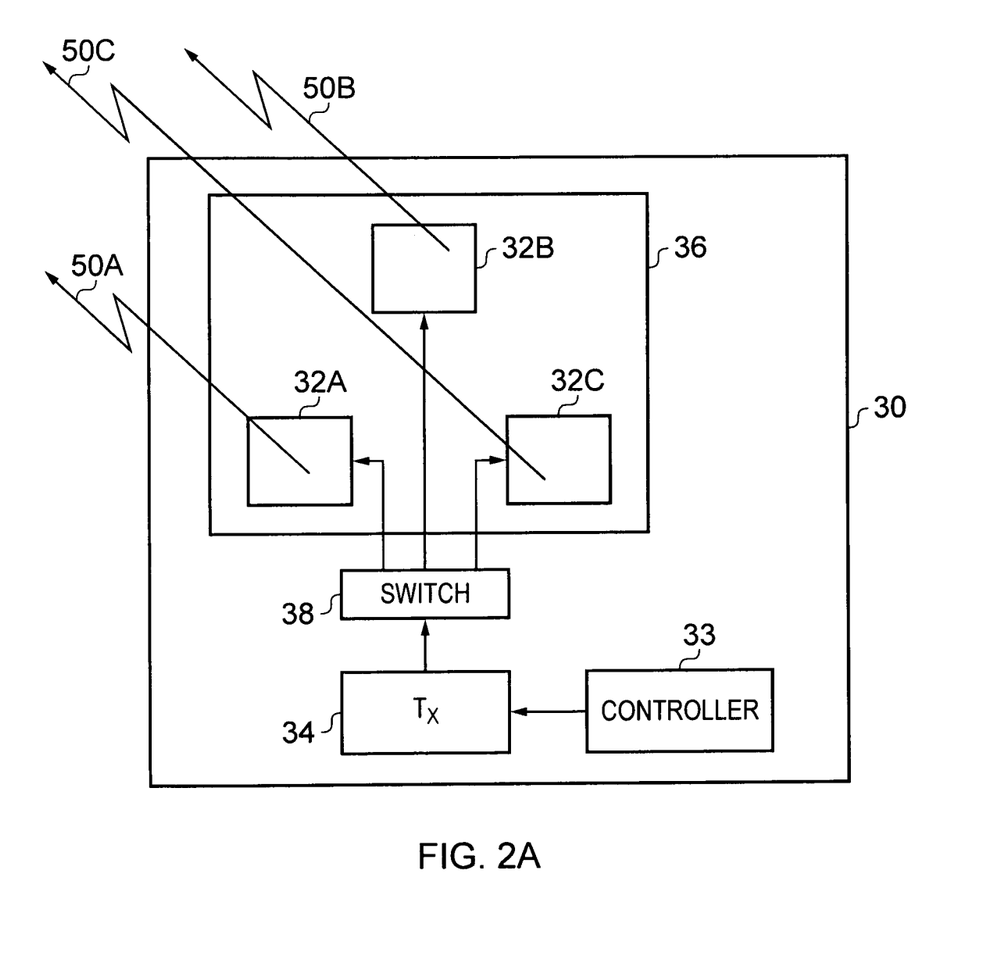
FIG. 2A is a schematic of a transmitter apparatus.

FIG. 2A schematically illustrates one example of the base station transmitter 30. The transmitter 30 comprises a controller 33, transmitter circuitry 34 and an antenna array 36 comprising a plurality of antenna elements 32A, 32B, 32C which transmit respective radio signals 50A, 50B, 50C . . . .

The one-way radio signals 50 may be transmitted periodically as beacons by the transmitter 30. The beacons are broadcast to multiple apparatus simultaneously.

In the illustrated example, separate signals 50 are transmitted via the array 36 of antenna elements 32 in a time division multiplexed fashion. A switch 38 is used to connect each one of the antenna elements 32 to the transmitter circuitry 34 one at a time, in a predefined order. The radio signals 50A, 50B, 50C from the different antenna elements 32A, 32B, 32C are therefore transmitted sequentially in different slots of a frame.

In the Figure only three different displaced antenna elements 32 are illustrated, although in actual implementations more antenna elements 32 may be used. For example 16 patch antenna elements could be distributed over the surface of a hemisphere. Three is the minimum number of radio signals required at the receiver apparatus 10 to be able to determine a bearing 82.

In other embodiments, there may be a separate transmitter circuit 34 associated with each antenna element 32. In this embodiment, it may be possible to transmit one or more of the signals 50 in parallel.

Each signal 50 has a characteristic that enables it to be discriminated by the receiver apparatus 10. The characteristic may be a feature of the signal itself such as a code sequence that has been modulated onto a carrier wave or it may be a feature of the signal's position relative to the other signals such as its 'slot' number within a frame. In the latter case, all of the signals in the slots of a frame may have the same or different code sequences.

The receiver apparatus 10 needs to obtain 'displacement information' from the received signals 50A, 50B, 50C that is dependent upon inter alia the relative displacements of the respective antenna elements 32A, 32B, 32C. In the example described in detail below, the displacement information includes phase information.

In one embodiment, it may be possible to modulate a carrier wave using convolution codes, as in code division multiple access. Explicit displacement information may then be determined at a receiver apparatus 10 by correlating the expected code against the received signal 50.

One advantage of this approach is that knowledge of how the array 36 of antenna elements 32 transmits is not required at the receiver as the displacement information is determined from data encoded onto the carrier rather than from a property of the carrier itself.

Another simpler embodiment, modulates the carrier wave using I-Q modulation, also known as quadrature phase shift modulation. In this modulation technique, two orthogonal carrier waves (sine and cosine) are independently amplitude modulated to define a symbol. At the receiver apparatus 10, the amplitude of the two orthogonal carrier waves is detected as a complex sample and the closest matching symbol determined. It should be appreciated that an identical signal transmitted from different antenna elements will be received with different phases because of the inherent phase characteristics of the antenna elements 32 when transmitting in different directions and also because of the additional time of flight for a signal 50 from one antenna element to reach the receiver apparatus 10 compared to another signal 50. The inherent presence of this 'time of flight' information within the phases of the received signals 50 enables the received signals 50 to be processed, as described in more detail below, to determine the bearing 82 of the receiver apparatus 10 from the transmitter 30.

One advantage of this approach is that the resolution required for the displacement information to be able to resolve relative spatial separation between the antenna elements 32 of a few centimeters would require a carrier frequency of the order 10 GHz but a much lower modulation rate may be used and therefore correspondingly small bandwidth and slower clock can be used.

One disadvantage of this approach is that knowledge of how an antenna array 36 transmits is required at the receiver apparatus 10 as the inherent displacement information is determined from a property (phase) of the carrier itself and antenna elements 32 typically transmit with different phase offsets at different angles. This knowledge may take the form of an array transfer function.

Figure 2B:
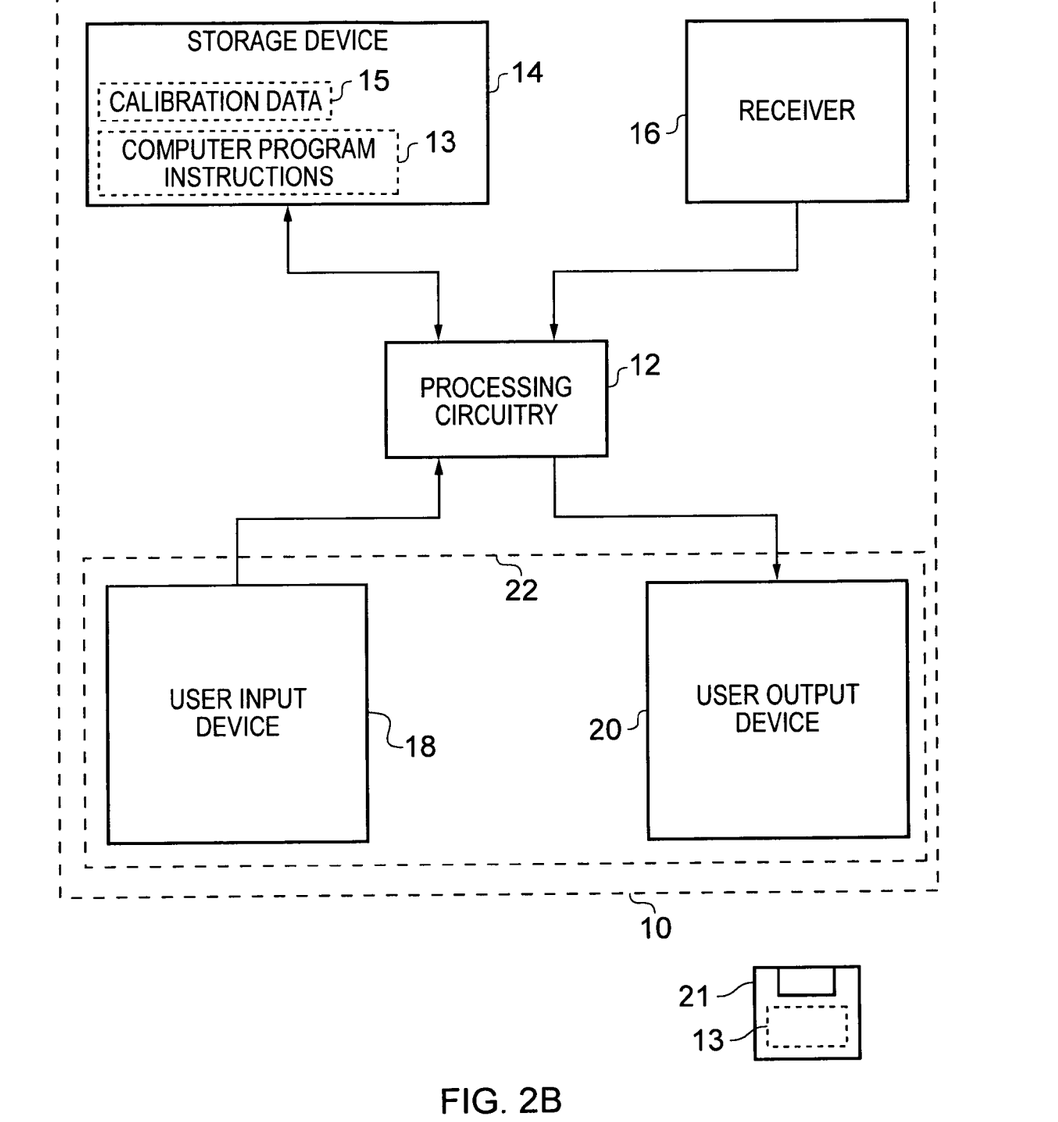
FIG. 2B is a schematic of a receiver apparatus.

FIG. 1B illustrates a schematic of a receiver apparatus 10. The apparatus 10 may, for example, be a hand portable electronic device such as a mobile radiotelephone. The apparatus 10 comprises processing circuitry 12, a storage device 14, a receiver 16, a user input device 18 and a user output device 20.

The processing circuitry 12 uses one or more detected radio signals 50 to estimate a bearing 82 from the first location 80; and uses the bearing estimate 82 to determine whether further detection of one or more radio signals is required before positioning the apparatus 10; and positioning of the apparatus 10 using a bearing and constraint information.

The portable apparatus itself does not need to transmit to determine its position. Furthermore it alone may perform the processing necessary to determine a bearing 82 and to estimate, using the bearing and constraint information, the position of the apparatus 10 along the bearing 82.

The processing circuitry 12 may be any type of processing circuitry. For example, the processing circuitry 12 may be a programmable processor that interprets computer program instructions 13 and processes data. Alternatively, the processing circuitry 12 may be, for example, programmable hardware with embedded firmware. The processing circuitry 12 may be a single integrated circuit or a set of integrated circuits (i.e. a chipset). The processing circuitry 12 may also be a hardwired, application-specific integrated circuit (ASIC).

It will be appreciated by those skilled in the art that, for clarity, the processing circuitry is described as being a separate entity to the receiver. However, it will be understood that the term processing circuitry may relate not only to a main processor of an apparatus, but also processing circuitry included in a dedicated receiver chipset, and even to a combination of processing circuitry included in a main processor and a dedicated receiver chipset.

A chipset for performing embodiments of the invention may be incorporated within a module. Such a module may be integrated within the apparatus 10, and/or may be separable from the apparatus 10.

The processing circuitry 12 is connected to receive an input from the receiver 16. The receiver 16 is configured to receive radio frequency signals. The radio signals may, for instance, have a transmission range of 100 meters or less.

For example, the radio frequency signals may be 802.11 wireless local area network (WLAN) signals, Bluetooth signals, Ultra wideband (UWB) signals or Zigbee signals.

The processing circuitry 12 is connected to write to and read from the storage device 14. The storage device 14 may be a single memory unit or a plurality of memory units.

The storage device 14 may store computer program instructions 13 that control the operation of the apparatus 10 when loaded into processing circuitry 12. The computer program instructions 13 may provide the logic and routines that enables the apparatus to perform the method illustrated in FIG. 3.

The computer program instructions 13 may arrive at the apparatus 10 via an electromagnetic carrier signal or be copied from a physical entity 21 such as a computer program product, a memory device or a record medium such as a CD-ROM or DVD.

The computer program instructions 13 provide: instructions for discriminating 210 between radio signals 50 received from a first location 80 by the receiver 16, in order to estimate 220 a bearing 82 from the first location 80; and instructions for estimating 230, using the bearing 82 and constraint information that is independent of the radio signals 50, a position of the receiver 16.

The processing circuitry 12 is connected to receive an input from the user input device 18. The processing circuitry 12 is also connected to provide an output to the user output device 20. The user output device 20 is for conveying information to a user and may be, for example, a display device. The user input device 18 and the user output device 20 together form a user interface 22. The user interface 22 may be provided as a single unit, such as a touch screen display device.

Figure 3:
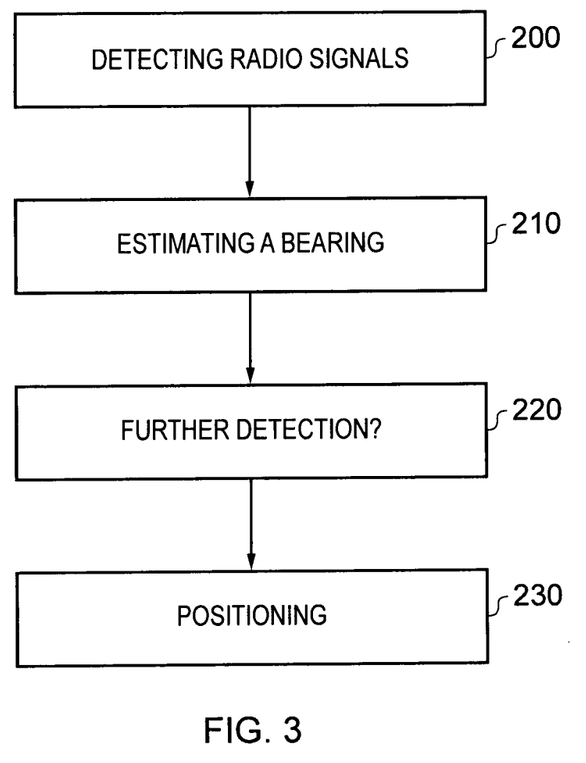
FIG. 3 is a flow diagram of a method of estimating a position of the apparatus.

FIG. 3 illustrates a method for estimating the position of the apparatus 10. Various embodiments of the method of FIG. 3 will be described hereinafter. Although the method will be described in the context of diversity transmission, it should be appreciated that it is also applicable to diversity reception. In diversity transmission, multiple radio signals are sent from spatially diverse antennas as illustrated in FIG. 1. In diversity reception, a radio signal is received at spatially diverse antennas.

In the following it will be assumed that the respective spatially diverse transmitted radio signals 50A, 50B, 50C illustrated in FIGS. 1 and 2 are sent in different slots of a TDMA frame and that the same code is modulated onto the signals using IQ modulation, in this case Binary Phase Shift Key (BPSK) modulation as it is the most robust. It will be appreciated that in other embodiments different types of signals may be used and different methods of discriminating the signals will be required.

At block 200 of the method of FIG. 3, the receiver 16 of the apparatus 10 detects radio signals 50 including first, second and third radio signals 50A, 50B, 50C.

At block 210, the processing circuitry 12 of the apparatus 10 uses the detected radio signals 50 to estimate a bearing 82 of the apparatus 10 from the first location 80.

The processing circuitry 12 may discriminate between the respective radio signals 50. In this example, this may be achieved by identifying which slot in the TDMA frame the signal was received in. At least three respective radio signals 50A, 50B and 50C will need to be discriminated.

The processing circuitry 12 obtains comparable complex samples (i.e. samples that represent same time instant) for the three respective radio signals 50A, 50B, 50C.

In some embodiments, the transmitter 30 may transmit calibration data 15 in a radio signal to the apparatus 10 for storage in memory 14, before the transmission of the radio signals 50, to enable the processing circuitry 12 of the apparatus 10 to discriminate between the radio signals 50. The calibration data 15 may, for example, be transmitted periodically as a beacon signal by the transmitter 30. In the described example, the calibration data 15 may include discrimination data that identifies the code used to modulate the signals, information about the TDMA frame, and possible information identifying the IQ modulation used and antenna array calibration data that includes information that defines the transfer function of the antenna array 36.

The calibration data 15 may be encrypted. A key to decrypt the calibration data 15 may be available from a remote server. For example, if the transmitter 30 is part of a transceiver for providing internet access, the decryption key may be obtainable from a remote server that is accessible via the transceiver. In an embodiment where the apparatus 10 also functions as a mobile telephone, the decryption key may be obtainable from a remote server connected to a mobile telephone network. Alternatively, the calibration data 15 itself may be available from a remote server via a mobile telephone network, rather than from the transmitter 30.

The processing circuitry 12 then estimates a bearing 82. One method of determining the bearing 82 is now described, but other methods are possible.

Once comparable complex samples (i.e. samples that represent same time instant) from each antenna element 32 are obtained the array output vector y(n) (also called as snapshot) can be formed at by the processing circuitry 12.

$$y(n) = [x_1, x_2, \ldots, x_M]^T, \quad (1)$$

Where $x_i$ is the complex signal received from the ith TX antenna element 32, n is the index of the measurement and M is the number of TX elements 32 in the array 36.

A Direction of Departure (DoD) can be estimated from the measured snapshots if the complex array transfer function $a(\phi,\theta)$ of the TX array 36 is known, which it is from calibration data 15.

The simplest way to estimate putative DoDs is to use beamforming, i.e. calculate received power related to all possible DoDs. The well known formula for the conventional beamformer is $$P_{BF}(\phi,\theta) = a^*(\phi,\theta)\hat{R}a(\phi,\theta), \quad (2)$$

Where, $$\hat{R} = \frac{1}{N}\sum_{n=1}^{N} y(n)y^*(n)$$

is the sample estimate of the covariance matrix of the received signals, $a(\phi,\theta)$ is the array transfer function related to the DoD $(\phi,\theta)$, $\phi$ is the azimuth angle and $\theta$ is the elevation angle.

Once the output power of the beamformer $P_{BF}(\phi,\theta)$ is calculated in all possible DoDs the combination of azimuth and elevation angles with the highest output power is selected to be the bearing 82.

The performance of the system depends on the properties of the TX array 36. For example the array transfer functions $a(\phi,\theta)$ related to different DoDs should have as low correlation as possible for obtaining unambiguous results. Correlation depends on the individual radiation patterns of the antenna elements 32, inter element distances and array geometry. Also the number of array elements 32 has an effect on performance. The more elements 32 the array 36 has the more accurate the bearing estimation becomes. In minimum there should be at least 3 antenna elements 32 in planar array configurations but in practice 10 or more elements should provide good performance.

Next, at block 220 the processing circuitry 12 uses the determined bearing estimate 82 to determine whether further detection of one or more radio signals is required before positioning the apparatus.

Next, at block 230 the processing circuitry 12 estimates a position of the apparatus 10 using a bearing and constraint information.

In some embodiments of the invention, the use of constraint information enables the processing circuitry 12 to determine the location of the apparatus 10 along the estimated bearing 82.

Figure 4:
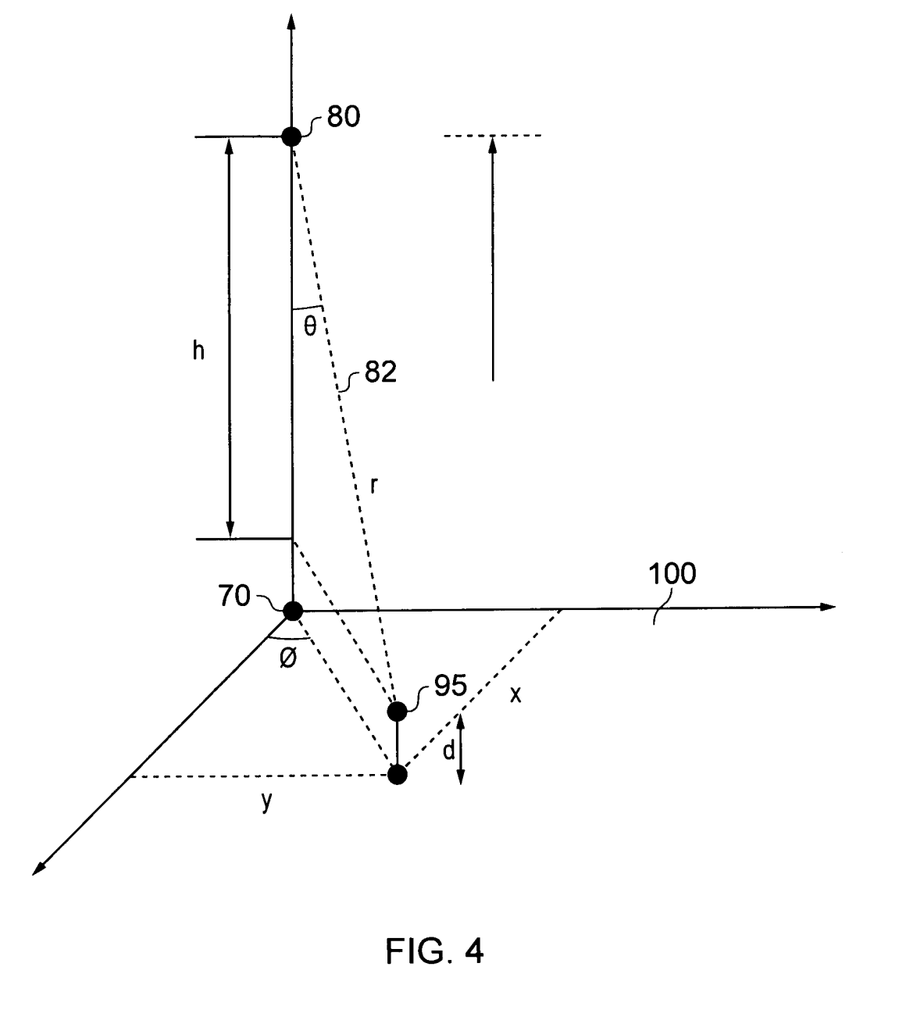
FIG. 4 illustrates a schematic for estimating the position of the apparatus using a displacement or range as a constraint.

FIG. 4 also illustrates the bearing 82 from the location 80 of the transmitter 30 to the location 95 of the apparatus 10, which has been estimated by the processing circuitry 12 following reception of the radio signals 50. The bearing 82 is defined by an elevation angle $\theta$ and an azimuth angle $\phi$.

Figure 5:
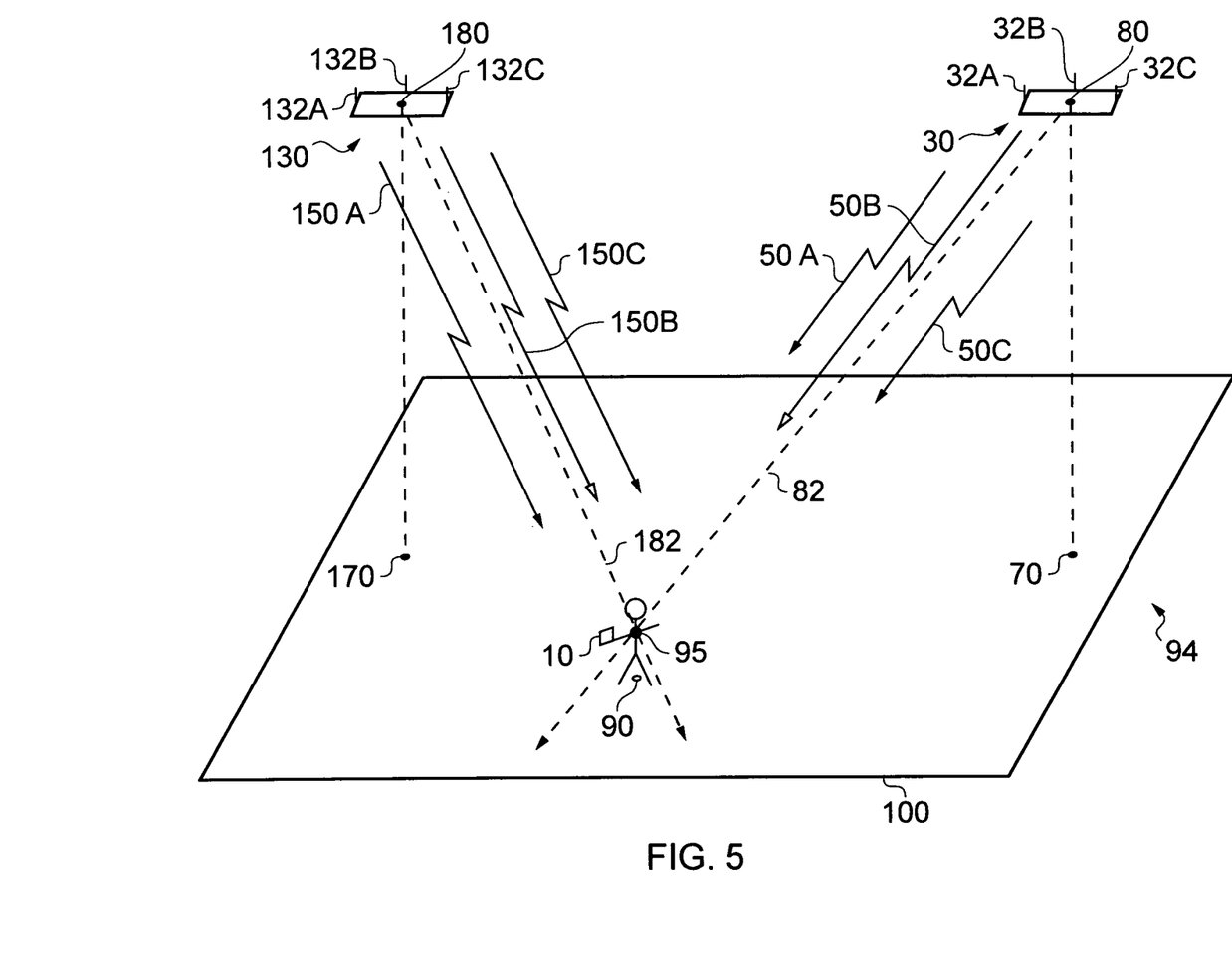
FIG. 5 illustrates a schematic for estimating the position of the apparatus using an additional bearing from another location as a constraint.
Figure 6:
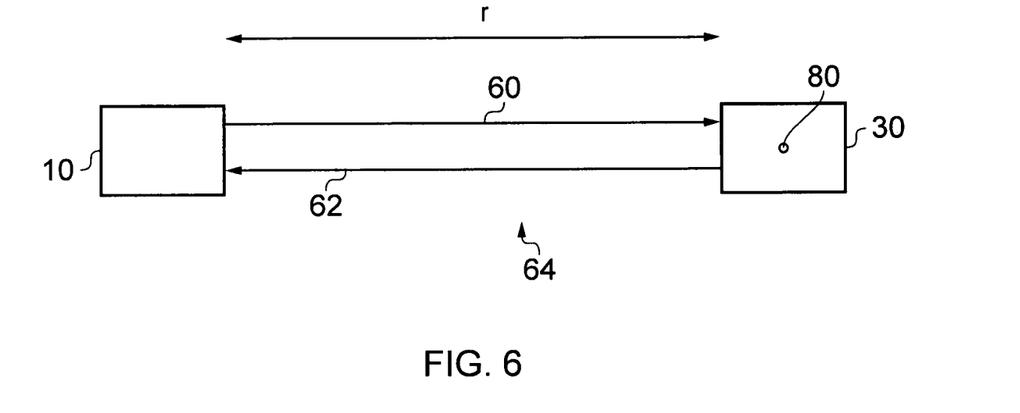
FIG. 6 schematically illustrates two-way communication for ranging.

The processing circuitry 12 may estimate the position of the apparatus 10 relative to the location 80 of the transmitter 30 in coordinates using the bearing (elevation angle $\theta$, azimuth angle $\phi$) and constraint information e.g. vertical displacement h (FIG. 4) or an additional bearing (FIG. 5) or range r (FIG. 4, FIG. 6). The processing circuitry 12 may estimate the position of the apparatus 10 in Cartesian coordinates by converting the coordinates using trigonometric functions.

FIG. 5 illustrates a building 94 having two transmitters 30, 130 located on the ceiling of the building 94 in this example. The two transmitters 30, 130 are of the same form as that of the transmitter 30 described in relation to in FIG. 1. The first transmitter 30 is positioned at a location 80 on the ceiling, directly above the point denoted with the reference numeral 70 on a floor 100 of the building 94. The second transmitter 130 is positioned at a location 180 on the ceiling, directly above the point denoted with the reference numeral 170 on the floor 100. The separation of the transmitters 30, 130 is large in comparison with the separation of the antenna elements 32 or 132 with their respective arrays.

In this embodiment, the apparatus 10 receives radio signals 50 from the first transmitter 30 and determines a bearing 82 of the apparatus 10 as described in relation to FIG. 3.

The apparatus 10 also receives radio signals 150 from the second transmitter 130 and determines, as constraint information, a bearing 182 of the apparatus 10 from the first transmitter 30 using the method as described in relation to FIG. 3. The discrimination of the radio signals 150A, 150B, 150C at block 210 and the estimation of the bearing 182 will require second calibration data including, for example, the transfer function of the antenna array used by the second transmitter 130.

The apparatus 10 may receive second calibration data from the second transmitter 130.

Once the bearings 82 and 182 have been estimated, the processing circuitry 12 may estimate that the apparatus 10 is situated at a position along bearing 82 as defined by the constraining bearing 182. It may be that processing circuitry 12 estimates an area that the apparatus 10 is likely to be positioned in if the accuracy of the bearings 82, 182 is such that the processing circuitry 12 is not able to pinpoint the position of the apparatus 10 with a high degree of precision. Once the position of the apparatus 10 has been estimated, the processing circuitry 12 may control the user output device 20 to convey the estimated position to the user.

FIG. 6 schematically illustrates a system comprising the apparatus 10 and the base station 30 at location 80. The apparatus 10 and the base station 30 are configured to cooperate using two-way communication 64 to determine the range r between the base station 30 and the apparatus 10.

At time t0, the apparatus 10 initiates the two-way communication 64 by sending a ranging request message 60. The base station 30 receives the ranging request message 60 and sends immediately in reply the ranging reply message 62. The time between the base station 30 receiving the ranging request message 60 and sending the ranging reply message 62 is ts. The ranging reply message 62 is received at the apparatus 10 at time t2. The time of flight Tf from the apparatus 10 to the base station 30 and back to the apparatus 10 is therefore t2−t1−ts. The range r is there tf/2c where c is the speed of light.

Figure 7:
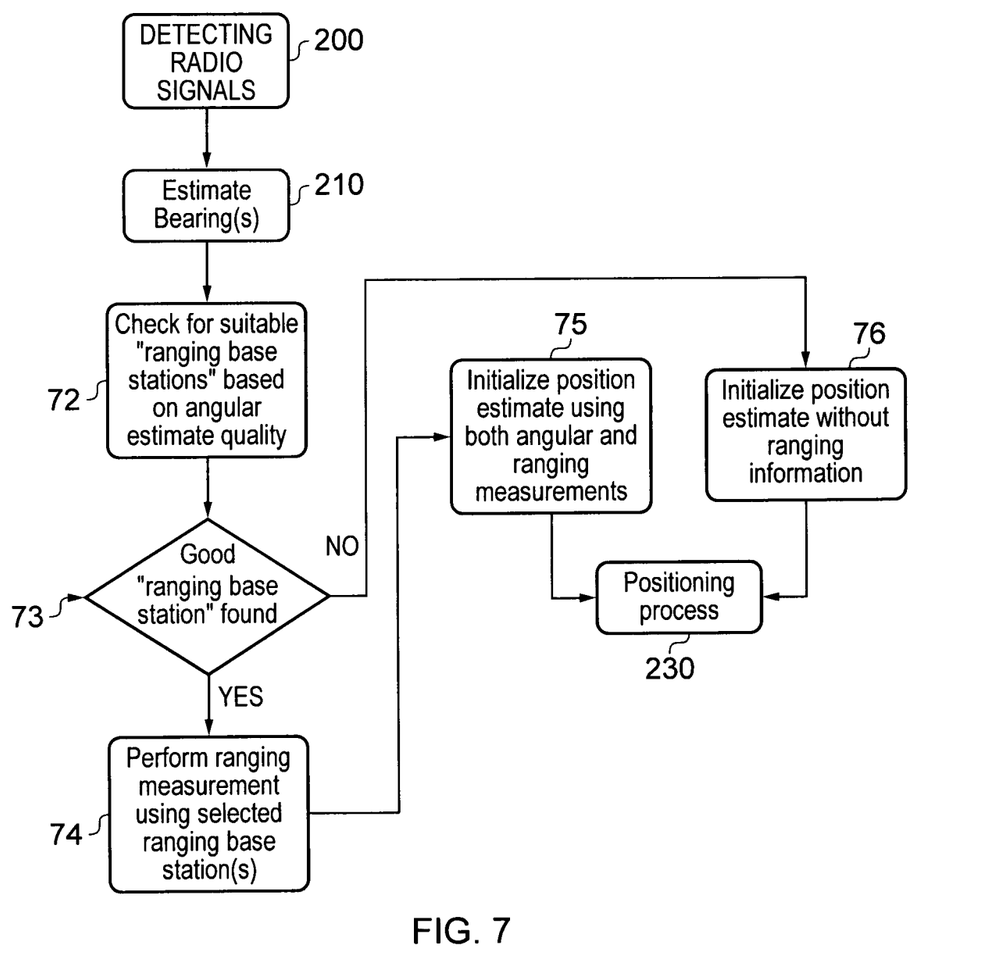
FIG. 7 schematically illustrates an example of a method of estimating a position of the apparatus.

FIG. 7 schematically illustrates a method in which an example of the block 220 of FIG. 3 is illustrated.

Blocks 200, 210, 230 are as described with reference to FIG. 3. However, in some implementations there may be more than one base station transmitter 30 and a bearing may be determined for each base station transmitter 30.

After estimating the bearing(s) at block 210, at block 72 the method determines the quality of the bearing estimate(s) and determines which of the bearing estimates are of sufficient quality.

A bearing estimate may be of sufficient quality when there is a line of sight between the apparatus 10 and the base station transmitter 30. A bearing estimate may be of insufficient quality when there is a multipath between the apparatus 10 and the base station transmitter 30. A multipath may be evidenced by two or more inconsistent bearing estimates resulting from block 210 for a single base station transmitter 30.

At block 73, if no bearing estimate is of sufficient quality the method moves to block 76, where the constraints for the positioning process 230 are set and do not include ranges.

At block 73, if one or more bearing estimates is of sufficient quality the method moves to block 74, where ranging of the base station transmitter 30 associated with the sufficient bearing is performed. If there is more than one suitable base station transmitter 30 associated with a sufficient bearing, a selection process may be carried out to select the one or more base station transmitters used for ranging. An example of the ranging method has previously been described with reference to FIG. 6.

Next at block 75 the constraints for the positioning process 230 are set and include the range or ranges determined at block 74.

Figure 8:
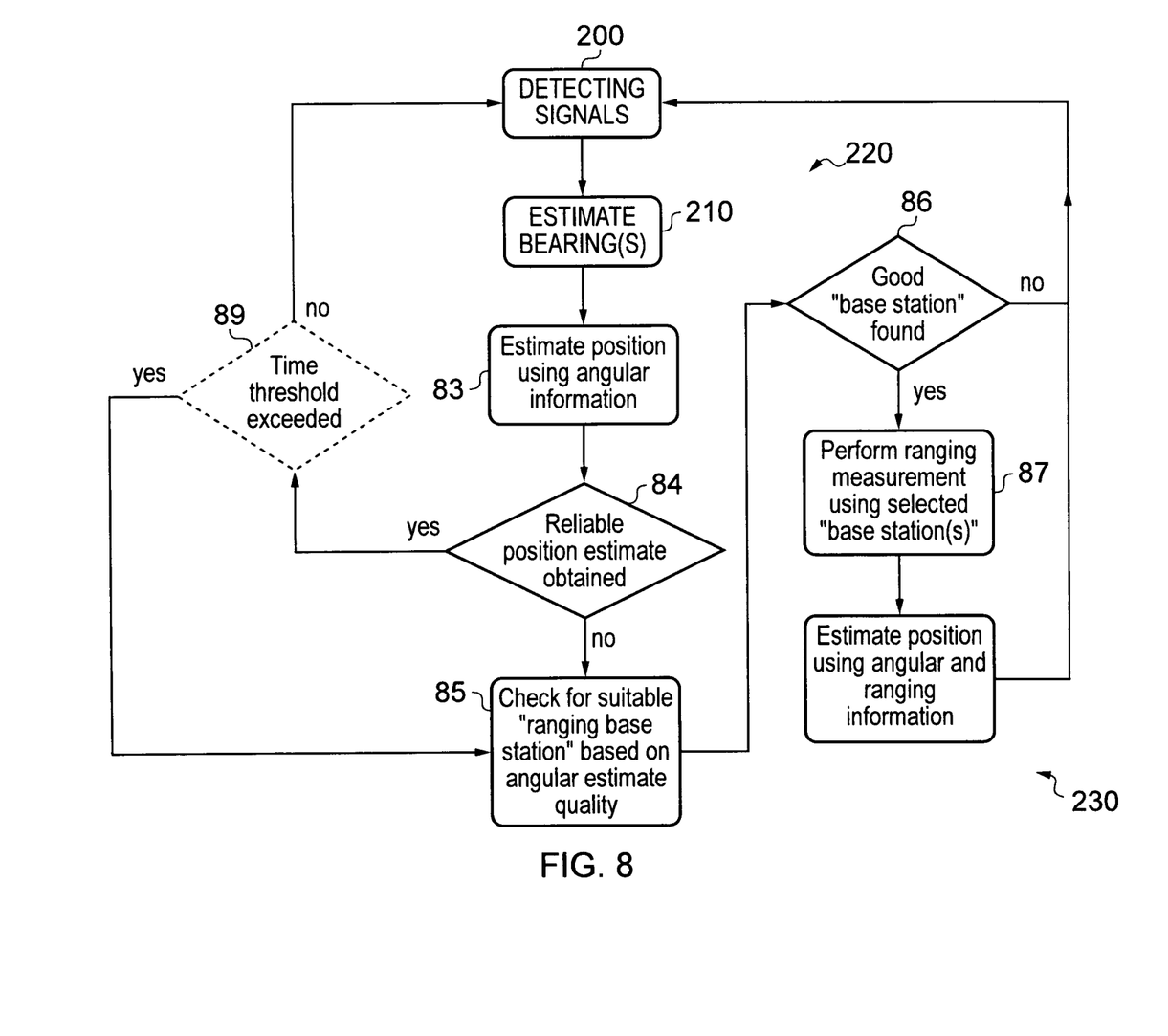
FIG. 8 schematically illustrates an example of a method of estimating a position of the apparatus.

FIG. 8 schematically illustrates a method in which an example of the block 220 of FIG. 3 is illustrated.

Blocks 200, 210, 230 are as described with reference to FIG. 3. However, in some implementations there may be more than one base station transmitter 30 and a bearing may be determined for each base station transmitter 30.

After estimating the bearing(s) at block 210, at block 72 the method attempts to position the apparatus using only bearings. That is, a bearing (if available) is used as the constraint information.

At block 84 it is determined whether or not a reliable position estimate has been determined in block 83.

If the answer is yes, the method through block 89 continues to determine additional bearings by repeating blocks 200, 210 and then repeats block 83 improving the accuracy of the position by using more bearings as constraints. The method breaks, at block 89, when a time threshold is exceeded. The method then moves to block 85.

If the answer is no, the method moves to block 85.

At block 85, the quality of the bearing estimate(s) are determined and it is determined which of the bearing estimates are of sufficient quality.

A bearing estimate may be of sufficient quality when there is a line of sight between the apparatus and the base station transmitter. A bearing estimate may be of insufficient quality when there is a multipath between the apparatus and the base station transmitter. A multipath may be evidenced by two or more inconsistent bearing estimates resulting from block 210 for a single base station transmitter 30.

Next at block 86, if no bearing estimate is of sufficient quality the method moves back to block 200 to search for new base station transmitter candidates.

At block 86, if one or more bearing estimates is of sufficient quality the method moves to block 87, where ranging of the base station transmitter 30 associated with the sufficient bearing is performed. An example of the ranging method has previously been described with reference to FIG. 6.

Next at block 230 the range or ranges determined at block 87 are used as additional constraint information in the positioning process.

The method then returns to block 200 to search for new candidates for base station transmitters.

In the illustrated method, the block 89 escapes to block 85 when the time threshold is exceeded. In other implementation, the method may terminate when the time threshold is exceeded. In this implementation, it is possible that ranging is not required if a reliable position estimate can be obtained at block 84 without ranging.

The blocks illustrated in the FIGS. 3, 7 and 8 may represent steps in a method and/or sections of code in the computer program 13. The illustration of a particular order to the blocks does not necessarily imply that there is a required or preferred order for the blocks and the order and arrangement of the block may be varied.

Although embodiments of the present invention have been described in the preceding paragraphs with reference to various examples, it should be appreciated that modifications to the examples given can be made without departing from the scope of the invention as claimed. For example, the apparatus 10 may not function as a mobile telephone. It may, for example, be a portable music player having a receiver for receiving radio signals.

Various examples of constraint information have been given in the preceding paragraphs, but the term "constraint information" it is not intended to be limited to these examples.

Features described in the preceding description may be used in combinations other than the combinations explicitly described.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method, comprising:
   detecting, at an apparatus, one or more radio signals from a first location;
   using the one or more detected radio signals to estimate a bearing from the first location;
   using the bearing estimate to determine whether further detection of one or more radio signals is required before positioning the apparatus; and
   positioning of the apparatus using a bearing and constraint information that includes information that defines a transfer function of an antenna array of the first location, wherein constraint information use in positioning of the apparatus is based on a quality of the bearing estimate.

2. A method as claimed in claim 1, further comprising obtaining the constraint information by receiving further radio signals.

3. A method as claimed in claim 1, wherein the constraint information comprises at least one of a bearing and a range.

4. A method as claimed in claim 1, wherein the bearing estimate is used to determine whether ranging the first location by further detection of one or more radio signals is required before positioning the apparatus, wherein the range is at least part of the constraint information.

5. A method as claimed in claim 4, wherein ranging the first location comprises two-way radio communication originated by the apparatus and terminated by the further detection of one or more radio signals.

6. A method as claimed in claim 4, further comprising determining whether the bearing estimate is of sufficient quality, and ranging the first location when the bearing estimate is of sufficient quality.

7. A method as claimed in claim 4, wherein the bearing estimate is used to determine whether estimating a second bearing to a second location by further detection of one or more radio signals is required before positioning the apparatus.

8. A method as claimed in claim 4, determining whether the bearing estimate is of sufficient quality, and estimating the second bearing to the second location when the bearing estimate is of insufficient quality.

9. A method as claimed in claim 4, comprising:
   detecting, at the apparatus, one or more radio signals from a second location;
   using the one or more detected radio signals to estimate a second bearing from the second location;
   using the bearing estimate and the second bearing estimate to determine whether ranging the first location and/or second location by further detection of one or more radio signals is required before positioning the apparatus.

10. A method as claimed in claim 1, wherein the transfer function of the antenna array is defined by information that is transmitted to multiple apparatuses via a one-way broadcast communication.

11. A method as claimed in claim 1, using the bearing estimate to determine whether the origination of two-way radio signalling is required before positioning the apparatus.

12. A method as claimed in claim 1, detecting, at the apparatus, the one or more radio signals from the first location at spatially diverse antennas.

13. A method, comprising:
   detecting, at an apparatus, one or more radio signals from a first location;

using the one or more detected radio signals to estimate a bearing from the first location;
using the bearing estimate to determine whether further detection of one or more radio signals is required before positioning the apparatus; and
positioning of the apparatus using a bearing and constraint information including information that defines a transfer function of an antenna array of the first location,
wherein each of the foregoing steps are performed solely at a hand portable apparatus.

14. An apparatus, comprising:
a receiver configured to detect one or more radio signals from a first location;
processing circuitry configured to use the one or more detected radio signals to estimate a bearing of the apparatus from the first location; and configured to use the bearing estimate to determine whether further detection of one or more radio signals is required before positioning the apparatus; and configured to position the apparatus using a bearing and constraint information that includes information that defines a transfer function of an antenna array of the first location, wherein constraint information use in positioning of the apparatus is based on a quality of the bearing estimate.

15. An apparatus as claimed in claim 14, wherein the receiver is configured to obtain the constraint information by receiving further radio signals.

16. An apparatus as claimed in claim 14, wherein the constraint information comprises at least one of a bearing and a range.

17. An apparatus, comprising:
means for detecting, at an apparatus, one or more radio signals from a first location;
means for using the one or more detected radio signals to estimate a bearing from the first location;
means for using the bearing estimate to determine whether further detection of one or more radio signals is required before positioning the apparatus; and
means for positioning of the apparatus using a bearing and constraint information that includes information that defines a transfer function of an antenna array of the first location, wherein constraint information use in positioning of the apparatus is based on a quality of the bearing estimate.

18. A computer program product, comprising a non-transitory computer readable medium having computer readable instructions stored thereon, which when executed by a processor causes an apparatus to:
use of one or more detected radio signals to estimate a bearing;
use of the bearing estimate to determine whether further detection of one or more radio signals is required before determining a position; and
use a bearing and constraint information including information that defines a transfer function of an antenna array to determine a position, wherein constraint information use in positioning of the apparatus is based on a quality of the bearing estimate.

* * * * *